United States Patent [19]
Thayer

[11] 3,973,731
[45] Aug. 10, 1976

[54] FLAP-TYPE TWO-DIMENSIONAL NOZZLE

[75] Inventor: Edward B. Thayer, Hobe Sound, Fla.

[73] Assignee: United Technologies Corporation, Hartford, Conn.

[22] Filed: Dec. 12, 1975

[21] Appl. No.: 640,377

[52] U.S. Cl. ..................... 239/265.39; 181/33 HD; 239/265.29
[51] Int. Cl.² ........................................ B64C 15/06
[58] Field of Search ................ 239/265.11, 265.13, 239/265.17, 265.19, 265.25, 265.27, 265.29, 265.33, 265.37, 265.39, 265.41; 181/33 HC, 33 HD

[56] References Cited
UNITED STATES PATENTS

| | | | |
|---|---|---|---|
| 3,262,264 | 7/1966 | Gardiner et al. | 239/265.29 X |
| 3,386,658 | 6/1968 | Mehr | 239/265.11 X |
| 3,454,227 | 7/1969 | Motycka | 239/265.39 |
| 3,511,441 | 5/1970 | Tumicki | 239/265.29 |
| 3,806,035 | 4/1974 | Calder | 239/265.17 |

*Primary Examiner*—Robert S. Ward, Jr.
*Attorney, Agent, or Firm*—Jack N. McCarthy

[57] ABSTRACT

A flap-type, two-dimensional nozzle for use with thrust creating vehicles which operate at both subsonic and supersonic speeds includes a rectangular exhaust with a convergent-divergent balanced flap system at the top and the bottom thereof. The top and bottom flap systems can be controlled individually or together in order to achieve their desired objective. The flap systems move between a position of minimum throat area and maximum throat area to achieve one range of control while both flap systems can move to an inner position providing for thrust reversal. Thrust vector control can be obtained by assymmetric individual positioning of the flap systems with respect to the engine centerline.

5 Claims, 3 Drawing Figures

U.S. Patent   Aug. 10, 1976   3,973,731
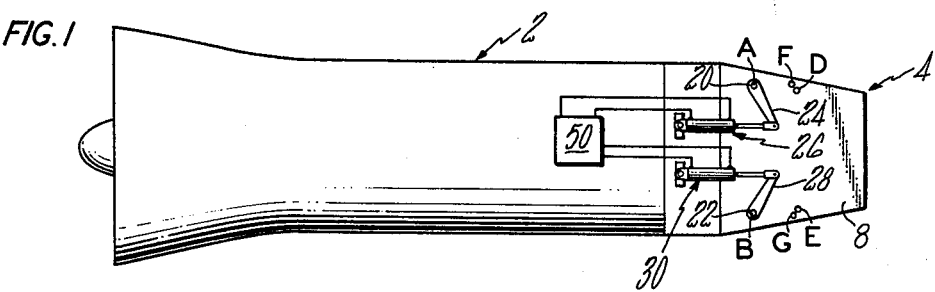
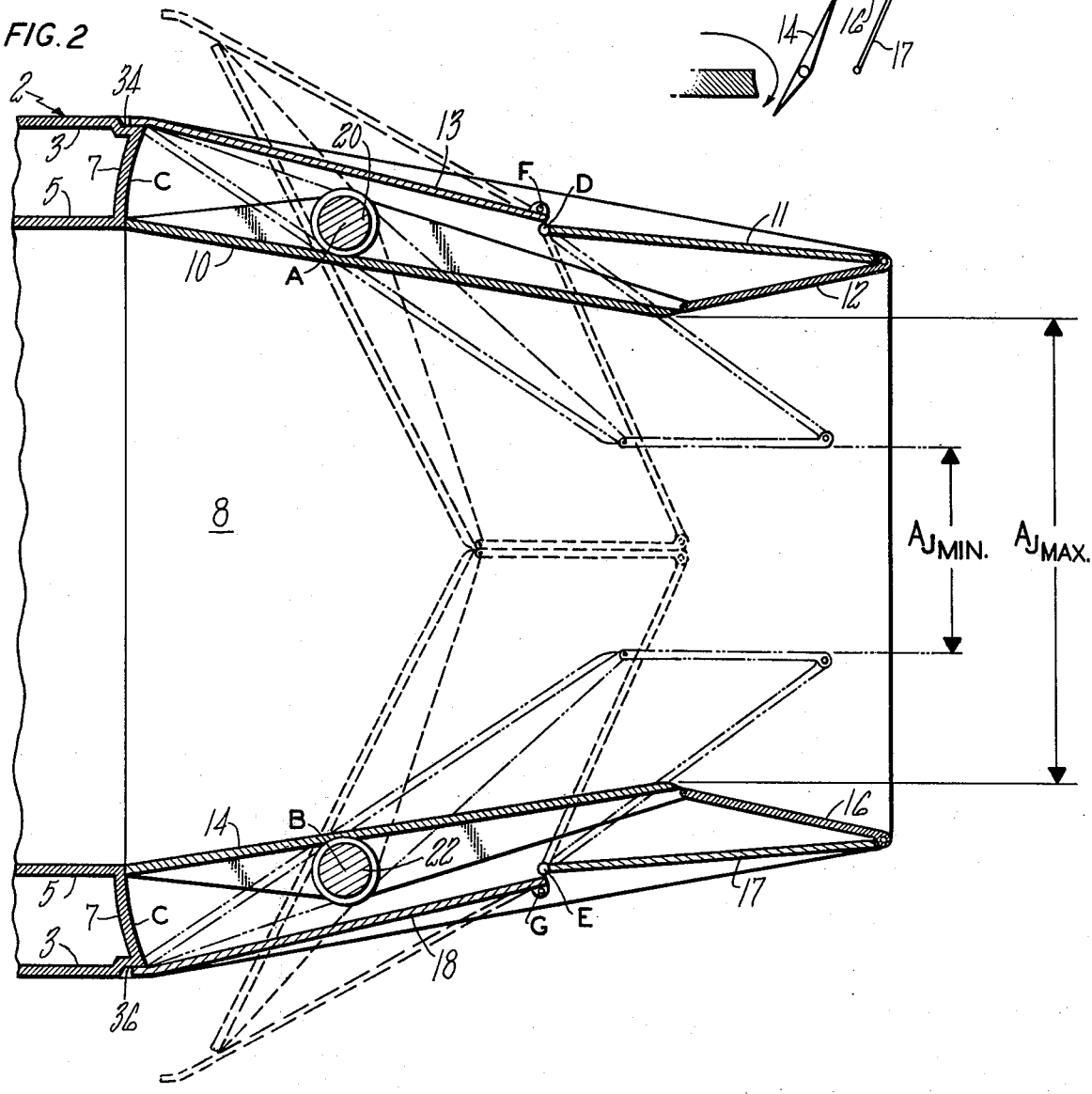

FLAP-TYPE TWO-DIMENSIONAL NOZZLE

BACKGROUND OF THE INVENTION

In the prior art, exhaust nozzle constructions having thrust reversing capability generally use pivoted flaps or clamshells to block axial flow within a duct and have doors in the nacelle or engine case to direct exhaust gases forwardly to provide reverse thrust.

This invention relates to variable area exhaust nozzles and more particularly to such exhaust nozzles which also have thrust vectoring, thrust reversing, and thrust modulation capabilities. A two-dimensional nozzle having convergent and divergent flaps is shown in U.S. Pat. Nos. 2,858,668 and 2,880,575.

SUMMARY OF THE INVENTION

A primary object of this invention is to provide an improved two-dimensional exhaust nozzle having two flap systems on opposite sides of a rectangular exit with each system having a convergent flap, a divergent flap and an external flap to guide the rear end of the divergent flap with the positioning of said flaps being variable.

It is a further object of the invention to provide convergent flaps which are substantially balanced at all times while the downstream part of the convergent flap controls throat area and serves as the connection to the forward end of the divergent flap while the forward end of the convergent flap controls reverser port area. When the downstream end of the convergent flap is rotated inwardly to reduce throat area below the minimum required for non-afterburning operation, the upstream end of the convergent flap starts to open a discharge port. Further inward rotation of the convergent flaps results in further decreases in throat area and increases in reverser port area such that the sum of these areas is substantially constant.

It is a further object of this invention to provide for thrust reversal when the two convergent flaps touch at the nozzle centerline, making axial flow completely blocked with all of the exhaust gases exiting through the top and bottom discharge ports. At some convergent flap position between forward and reversed thrust, a "null" thrust position will occur.

It is a further object of this invention to provide for thrust vectoring by moving on flap system to its thrust reversal position while the other flap system remains in an axial thrust mode.

It is a further object of this invention to provide a two-dimensional exhaust nozzle having flap systems which will provide the throat area variation needed for afterburning operation in the forward thrust mode. The external flap controls the area ratio of the divergent flap such that a low area ratio occurs at minimum throat area for cruise conditions, while at the large throat area intended for high Mach number afterburning, the nozzle provides a high area ratio.

It is another object of the present invention to provide a nozzle construction wherein the nozzle aspect ratio can be formed having any rectangular cross section.

It is further object of the present invention to provide for one flap system being actuated to rotate toward the nozzle centerline while the other flap system is rotated away from the centerline for thrust vector control.

BRIEF DESCRIPTION OF THE DRAWING

FIG. 1 is a view illustrating a location of a two-dimensional nozzle on a gas turbine engine.

FIG. 2 is an enlarged schematic view showing three symmetric positions of the flaps.

FIG. 3 is a small diagrammatic view showing a portion of the flaps having only a downward deflected thrust.

DESCRIPTION OF THE PREFERRED EMBODIMENT

Referring to FIG. 1 the turbojet engine 2 shown includes a conventional compressor section, burner section and turbine section with an exhaust duct and two-dimensional nozzle 4. The engine 2 can include an afterburner or be another type of gas producer. The two-dimensional nozzle 4 has a rectangular cross section and can be connected to the circular exhaust duct of an engine by a transition section. The transition section takes the flow from a circular cross section to a rectangular cross section while maintaining the flow area substantially the same.

The two-dimensional nozzle 4 comprises two side plates 8 extending rearwardly from the rear of the engine 2. A flap system is positioned at the top and the bottom of the two-dimensional nozzle 4 with each system having four cooperating flaps 10, 12, 11 and 13, and 14, 16, 17 and 18, respectively. Each flap 10 and 14 is pivotally mounted between the side plates 8 on axes A and B, respectively. The forward ends of the flaps 10 and 14 cooperate with the upper and lower ends of the rectangular exit of the turbojet engine 2. Each upper and lower end is formed of two spaced walls 3 and 5 with an interconnecting rearwardly facing member 7 having a curved surface C to permit movement of the forward end of the flaps 10 and 14 thereby while performing a sealing function. The forward end of flap 12 is pivotally mounted to the rearward end of flap 10 and the forward end of flap 16 is pivotally mounted to the rearward end of flap 14 in the same manner.

Flaps 11 and 17 have their forward ends pivotally mounted between the side plates 8 on axes D and E. To provide a guiding movement to the ends of the flaps 12 and 16, respectively, the rearward end of flap 12 is pivotally mounted to the rearward end of flap 11 and the rearward end of flap 16 is pivotally mounted to the rearward end of flap 17, in the same manner. It can be seen that as flaps 10 and 14 are symmetrically rotated each around its axis, they can move between the positions shown in FIG. 2 in solid lines, phantom lines, and dotted lines.

The solid line position shown of a flap system (see FIG. 2) sets forth the position of maximum throat area ($A_{J_{max}}$) while the phantom line position shown of a flap system sets forth the position of minimum throat area ($A_{J_{min}}$). It can be seen that at the solid line position of the flap system including flaps 10, 12 and 11, the forward end of the flap 10 is positioned at the inner edge of the top surface C, and at the solid line position of the flap system including flaps 14, 16 and 17, the forward end of the flap 14 is positioned at the inner edge of the bottom surface C. This positioning places the forward ends of the flaps 10 and 14 in a manner so as to have a smooth flow of the exhaust of the turbojet engine as it passes from the engine to the nozzle 4.

The flaps 10 and 14 each have a shaft 20 and 22 fixed thereto and extending along the under surface thereof, respectively, with their centerlines forming the axes A and B. The ends of the shafts 20 and 22 extend through the side plates 8. To actuate the upper or top flap system, a lever 24 is fixed to the portion of the shaft 20 extending through the side plate 8 with a cylinder and piston unit 26 interconnected between the exterior of the engine and the free end of the lever 24 to rotate the shaft 20 and, therefore, actuate the upper or top flap system. To actuate the lower or bottom flap system, a lever 28 is fixed to the portion of the shaft 22 extending through the side plates 8 with a cylinder and piston unit 30 interconnected between the exterior of the engine and the free end of the lever 28 to rotate the shaft 22 and, therefore, actuate the lower or bottom shaft system.

A control 50 directs fluid to the units 26 and 30 to achieve operation of the flap systems of nozzle 4. The control 50 can direct fluid to the units 26 and 30 to move them collectably in a like manner or each can be controlled separately to achieve any desired positioning of the two upper and lower flap systems. While symmetrical positioning is shown in FIG. 2 for (1) maximum throat area, (2) minimum throat area and (3) thrust reversal, a differential positioning of the upper and lower flap systems is shown in FIG. 3 wherein the lower flap system is shown at the thrust reversal position while the upper flap system is shown at its position of minimum throat area - it can be seen that this positioning gives only a downward deflected thrust with a small portion of forward thrust. Other differential positioning can be used.

Flaps 13 and 18 are positioned externally of the flaps 10 and 14, respectively, to provide a smooth fairing over the exterior of the top and bottom portions of the nozzle 4. Flap 13 is pivotally mounted at its rearward end between side plates 8 on axis F and flap 18 is pivotally mounted at its rearward end between side plates 8 on axis G. The rearward end of the flap 13 has shaft portions on each side which extend through the side plates 8, the same pivotal mounting structure is used for flap 18. The axes F and G are located just outwardly from the axes D and E, respectively.

During operation of the engine where the flap systems are merely moved between their positions shown in solid lines and their position shown in phantom lines, the forward ends of the flaps 13 and 18 are located in notches 34 and 36, respectively, of the upper and lower walls 3. Each of the flaps 13 and 18 are spring biased to its closed position. The spring biasing means can be a coil type placed around the pivotal shafts of flaps 13 and 18, a tension spring mounted between each of the flaps adjacent its forward end and fixed to the fixed structure of engine 2 such as at the wall 3, or any other spring biasing means desired can be used. When a flap system is moved from its phantom line position, of minimum throat area, to a desired position of reverse thrust, the forward end of the flap 10 or 14 opens its cooperating flap 13 or 18, respectively, against the spring biasing means to permit exhaust flow to pass from the nozzle between the surface C and flap 10 or 14. As shown in FIG. 3, an example is set forth wherein only one flap system is moved to a position whereby exhaust is permitted to flow outwardly and past the flap 14 at its forward end.

Thrust vector control can be obtained with this nozzle arrangement through individual positioning of the upper and lower flap systems. One position to achieve an upward vectored thrust would be to place the lower flap system in its phantom position (as shown in FIG. 2) and its upper flap system in its solid line position (as shown in FIG. 2). To achieve a downward vectored thrust the positions of the upper and lower flap systems are reversed, that is, the upper flap system is placed in its phantom line position and the lower flap system is placed in its solid line position. Varying degrees of thrust vector control can be obtained by differential positioning between the two just mentioned.

After this type of vectoring, we go to the positioning shown in FIG. 3 where one flap system goes beyond the normal operating range of the nozzle for ordinary engine control between the position giving minimum area and maximum area opening. This new positioning includes the movement of one of the flaps 10 or 14 into a position in which exhaust flow is permitted to be directed between the surface C and the forward edge of one of the flaps 10 or 14. It is noted that the convergent flaps 10 and 14 can be pivotably mounted so that when they are rotated inwardly to reduce the throat area below the minimum required and the upstream end of the flap starts to form a discharge port, the decreases in throat area and decreases in port area are such that the sum of these areas remains constant during the transition period between the minimum throat area required for non-afterburning to the thrust reversal position.

I claim:

1. A flap-type, two-dimensional nozzle having a rectangular inlet, fixed sides extending rearwardly from each side of said inlet, a pivotally mounted convergent top flap, said pivotally mounted convergent top flap being pivotally mounted on a first axis between said fixed sides, said first axis of said convergent top flap being located between its ends, a pivotally mounted convergent bottom flap, said pivotally mounted convergent bottom flap being pivotally mounted on a second axis between said fixed sides, said second axis of said convergent bottom flap being located between its ends, a divergent top flap, said divergent top flap having its forward end pivotally mounted to the rearward end of said convergent top flap, a divergent bottom flap, said divergent bottom flap having its forward end pivotally mounted to the rearward end of said convergent bottom flap, a top external flap, said top external flap having its forward end pivotally mounted between said fixed sides and the rearward end of said top external flap being pivotally mounted to the rearward end of said top divergent flap, a bottom external flap, said bottom external flap having its forward end pivotally mounted between said fixed sides and the rearward end of said bottom external flap being pivotally mounted to the rearward end of said bottom divergent flap, means for actuating said plurality of said top flaps and said bottom flaps.

2. A nozzle as set forth in claim 1 wherein the forward edge of each of said convergent flaps forms a sealing relationship with a rearwardly facing curved surface, each curved surface being fixed to said engine and extending outwardly from the top and bottom edge of the rectangular inlet, respectively, to an outer edge.

3. A nozzle as set forth in claim 2 wherein said convergent top and bottom flaps can move between a position where they form a minimum throat opening and a maximum throat opening for conventional engine operation requiring forward thrust, the forward edges of said convergent top and bottom flaps each maintaining its sealing relationship with said curved surfaces during this range of movement.

4. A nozzle as set forth in claim 3 wherein the forward end of said convergent top and bottom flaps moves outwardly past the outer edge of its cooperating curved surface as the rearward end of the convergent top and bottom flaps moves inwardly from its minimum throat opening.

5. A nozzle as set forth in claim 4 wherein a fairing flap is located outwardly from each convergent flap, each fairing flap being pivotally mounted at its rearward end between said fixed sides, the forward end of each of said fairing flaps being positioned adjacent the outer edge of the curved surface at the forward end of the associated converging flap, means biasing each fairing flap to this position, said forward end of each convergent flap contacting its associated fairing flap as it is moved outwardly past the outer edge of the curved surface moving the fairing flap to an open position to permit exhaust flow to pass outwardly therefrom producing a force in a thrust reversing direction.

* * * * *